(12) United States Patent
Buchanan

(10) Patent No.: US 11,717,388 B2
(45) Date of Patent: *Aug. 8, 2023

(54) MULTI-CANNULA NEGATIVE PRESSURE IRRIGATION SYSTEM

(71) Applicant: L. Stephen Buchanan, Santa Barbara, CA (US)

(72) Inventor: L. Stephen Buchanan, Santa Barbara, CA (US)

(*) Notice: Subject to any disclaimer, the term of this patent is extended or adjusted under 35 U.S.C. 154(b) by 253 days.

This patent is subject to a terminal disclaimer.

(21) Appl. No.: 17/027,089

(22) Filed: Sep. 21, 2020

(65) Prior Publication Data

US 2021/0059799 A1 Mar. 4, 2021

Related U.S. Application Data

(63) Continuation of application No. 15/750,248, filed as application No. PCT/US2016/064978 on Dec. 5, 2016, now Pat. No. 10,779,920.

(60) Provisional application No. 62/262,897, filed on Dec. 3, 2015.

(51) Int. Cl.
*A61C 17/02* (2006.01)
*A61C 5/40* (2017.01)

(52) U.S. Cl.
CPC ............. *A61C 17/02* (2013.01); *A61C 5/40* (2017.02); *A61C 17/0208* (2013.01)

(58) Field of Classification Search
CPC ........ A61C 17/02–0208; A61C 17/024; A61C 17/028; A61C 19/06–08; A61C 5/40; A61C 5/46; A61C 5/50

See application file for complete search history.

(56) References Cited

U.S. PATENT DOCUMENTS

| | | |
|---|---|---|
| 2,173,637 A | 9/1939 | Riedener |
| 2,862,495 A | 12/1958 | Gewecke |
| 3,181,336 A | 5/1965 | Schofield |
| 3,871,099 A | 3/1975 | Kahn |
| 4,021,921 A | 5/1977 | Detaille |
| 4,276,880 A | 7/1981 | Malmin |
| 4,993,941 A | 2/1991 | Malta et al. |
| 4,993,947 A | 2/1991 | Grosrey |
| 5,171,146 A | 12/1992 | Guerci |
| 6,079,979 A | 6/2000 | Riitano |
| 6,386,871 B1 | 5/2002 | Rossell |
| 6,537,068 B2 | 3/2003 | Kusano |

(Continued)

FOREIGN PATENT DOCUMENTS

CN 205339187 U 6/2016

*Primary Examiner* — Edward Moran
*Assistant Examiner* — Matthew P Saunders
(74) *Attorney, Agent, or Firm* — Gable Gotwals

(57) ABSTRACT

This invention relates to a negative pressure irrigation system including one or more negative pressure irrigation needles sized for insertion into a canal of a tooth, each needle having a closed distal end and two suction inlet ports located opposite one another immediately proximal to the closed distal end. The needles are placed in communication with a dental vacuum system by way of a suction manifold. An irrigant inlet tube supplies irrigant from an irrigant container into a pulp chamber or a tooth. The irrigant inlet tube may include a tapered end designed to tightly fit into a lateral irrigant supply port previously drilled into the pulp chamber. A light-cure polymer seals the inlet tube and needles when in use.

7 Claims, 4 Drawing Sheets

(56) References Cited

U.S. PATENT DOCUMENTS

| | | |
|---|---|---|
| 6,997,714 B1 | 2/2006 | Schoeffel |
| 7,226,288 B2 | 6/2007 | Schoeffel |
| 7,270,544 B2 | 9/2007 | Schemmer et al. |
| 7,891,977 B2 | 2/2011 | Riva |
| 8,827,705 B2 | 9/2014 | Schoeffel |
| 9,579,485 B2 | 2/2017 | Oborn et al. |
| 9,713,573 B2 | 7/2017 | Carlyon et al. |
| 9,839,738 B2 | 12/2017 | Beauvais et al. |
| 9,872,748 B2 | 1/2018 | Schoeffel |
| 10,779,920 B2 * | 9/2020 | Buchanan .......... A61C 17/0208 |
| 2003/0013064 A1 * | 1/2003 | Zirkel .................... A61C 17/02 |
| | | 433/81 |
| 2004/0193104 A1 | 9/2004 | Jervis |
| 2005/0170312 A1 * | 8/2005 | Pond ........................ A61C 5/40 |
| | | 433/81 |
| 2005/0287498 A1 * | 12/2005 | Schoeffel ................ A61C 5/50 |
| | | 433/81 |
| 2006/0110710 A1 * | 5/2006 | Schemmer ............. A61K 33/00 |
| | | 433/81 |
| 2006/0223026 A1 | 10/2006 | Kuroiwa et al. |
| 2007/0244425 A1 | 10/2007 | Pond |
| 2007/0287125 A1 * | 12/2007 | Weill ....................... B08B 9/08 |
| | | 433/81 |
| 2008/0014545 A1 * | 1/2008 | Schippers ................ A61C 5/40 |
| | | 433/32 |
| 2008/0032259 A1 | 2/2008 | Schoeffel |
| 2008/0138761 A1 * | 6/2008 | Pond ........................ A61C 5/40 |
| | | 433/32 |
| 2008/0280252 A1 | 11/2008 | Riva |
| 2009/0004621 A1 | 1/2009 | Quan et al. |
| 2010/0190133 A1 | 7/2010 | Martinez |
| 2014/0302454 A1 | 10/2014 | Maxwell et al. |
| 2016/0067023 A1 | 3/2016 | Castelo Baz et al. |
| 2017/0340413 A1 * | 11/2017 | Burns ....................... A61C 5/40 |
| 2018/0153644 A1 | 6/2018 | Bosisio et al. |

\* cited by examiner

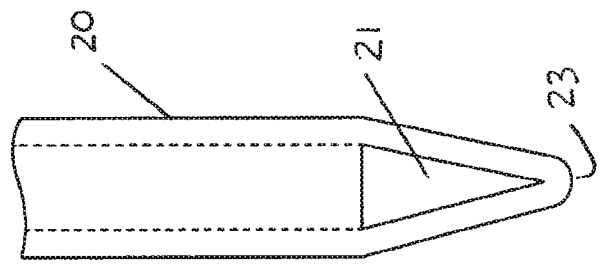
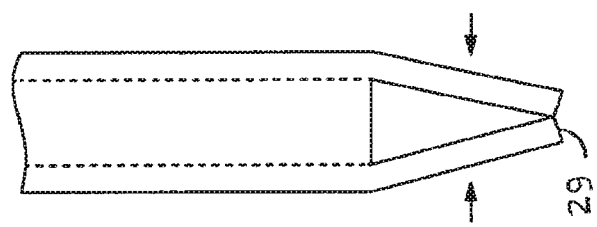
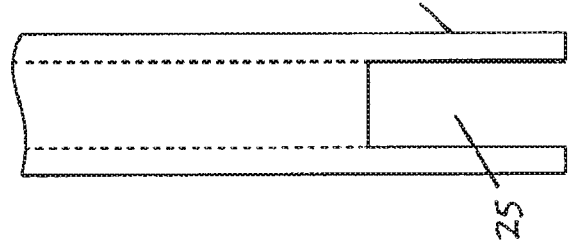
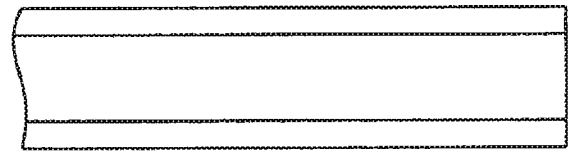
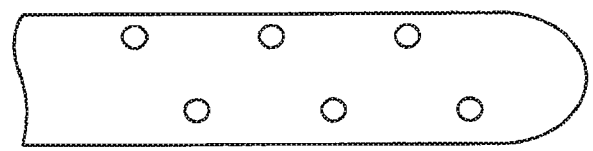

MULTI-CANNULA NEGATIVE PRESSURE IRRIGATION SYSTEM

CROSS REFERENCE TO RELATED APPLICATIONS

This application is a continuation application claiming priority to U.S. patent application Ser. No. 15/750,248, filed Feb. 5, 2018, which was a national phase filing of PCT Patent Application No. PCT/US2016/064978 filed Dec. 5, 2016, which claimed priority to U.S. Provisional Application No. 62/262,897 filed Dec. 3, 2015, all of which are incorporated herein by reference.

BACKGROUND OF THE INVENTION

This invention is in the field of endodontic instruments and, more specifically, negative pressure irrigation systems for use in cleaning root canals.

Scientific research and clinical experience shows negative pressure irrigation ("NPI") to be 1) one of the most effective methods of cleaning or debriding root canals, 2) very inexpensive as it uses sodium hypochlorite, the most inexpensive and most universally accepted endodontic irrigating solution and the suction system found in every dental office, and 3) the safest method of applying the highly toxic sodium hypochlorite (NaOCl, common known as bleach) solution into root canals. Despite the exceptional efficacy shown by research and clinical experience, prior art NPI systems such as the EndoVac™ system (Kerr Endodontics) include several design features that have severely limited their use in clinical practice.

The first limiting feature is the needle, which includes 12 micro-ports within the first 1 mm near the distal end (see e.g. FIG. 1). The ports frequently clog as dental pulp fragments and cut dentin debris is sucked into the ports during use. The EndoVac needle, for example, has a size 0.32 mm external diameter, is a non-tapered needle with four sets of three laser-cut, laterally positioned offset holes are immediately proximal to its closed distal end (about the first 0.70 mm). Each hole of the set is 100μ in diameter (0.1 mm, smaller than the internal diameter of the needle) and spaced 100μ apart.

The second limiting feature is the time required by the clinician when using the system in multi-canaled teeth because the clinician must actively hold the NPI needle at the end of in a given canal as the solution is evacuated down the root canals and out into the suction system attached to the NPI needle. One positive aspect of PPI is that it has a multi-cannular effect, meaning that in teeth with multiple canals, they are all cleaned simultaneously with PPI irrigation.

Current NPI systems are limited to a uni-cannular effect, meaning that only a single canal at a time can be actively cleaned with NPI. Because of this, prior art NPI systems actually increase the dentist's workload in multi-cannular teeth. Currently, using NPI instead of PPI can reduce the time needed to complete cleaning of a root canal with NaOCl from 40 minutes (PPI) to 5 minutes (NPI), however if NPI requires five minutes of constant NPI irrigation per canal, that necessity times four equals twenty continuous minutes of attention required by the dentist rather than only ten minutes of the dentist's time spent actively irrigating with PPI.

The third limiting feature is that NPI currently requires constant attention by the clinician to repeatedly add NaOCl to the access cavity as the solution is drawn to the end of the canal and is evacuated through the NPI needles. Whether the tooth being treated needs five minutes or 20 minutes of constant attention during NPI irrigation, it is much effort expended for a very simple need, replenishment of solution.

SUMMARY

The preferred embodiments of a multi-cannular negative pressure irrigation ("NPI") system as disclosed here resolves all of the prior art limitations outlined above and offers the safest, least expensive, and most effective method currently known to endodontic treatment.

In a preferred embodiment, the NPI system includes one or more negative pressure irrigation needles each having a closed distal end and two suction inlet ports located opposite one another immediately proximal to the closed distal end. The ports may be triangular in shape and, because of their size, are the only ports required along the needle. Preferably, no other suction ports are proximal to these.

The needles are placed in communication with a dental vacuum system by way of a suction manifold. On one side of the suction manifold, there is a single tube arranged for connection to the dental vacuum system. On another side of the manifold, there are one or more needle tubes, each arranged for connection to a corresponding negative pressure irrigation needle.

An irrigant inlet tube supplies irrigant from an irrigant container into a pulp chamber or a tooth. The irrigant inlet tube may include a tapered end designed to tightly fit into a lateral irrigant supply port previously drilled into the pulp chamber.

When in use the irrigant inlet tube is placed into the pulp chamber of the tooth and, along with the negative pressure irrigation needles which are placed in a respective canal of the tooth, is sealed with a light-cure polymer at a cavo surface of an access cavity. This creates a negative pressure environment that draws irrigant from the irrigant container through the irrigant inlet tube and into the pulp chamber, after which the irrigant is suctioned down a canal and is evacuated from the canal by the negative pressure irrigation needle, thus maintaining a closed system vacuum.

The NPI needle's suction ports may be formed by cutting a slot into a square-cut tip end of a needle material; bending a remaining sidewall portion of the needle material located on opposing sides of the slot toward one another so a respective tip end of each remaining sidewall portion contacts an opposing respective tip end; joining, welding, or bonding together the two tip ends when in contact with one another to create the closed distal end.

BRIEF DESCRIPTION OF THE DRAWINGS

FIG. 1 is a prior art negative pressure irrigation ("NPI") needle.

FIG. 2A is a preferred embodiment of a NPI needle prior to a first step of its fabrication process.

FIG. 2B is the needle of FIG. 2A after a slot is cut into the tip end.

FIG. 2C is the needle of FIG. 2B after opposing ends of the slot are brought together.

FIG. 2D is the needed of FIG. 2C after the ends are welded together, providing two inlet ports, one on each side of the needle, for suction.

ELEMENTS AND NUMBERING USED IN THE DRAWINGS AND DETAILED DESCRIPTION

Figure 3A:
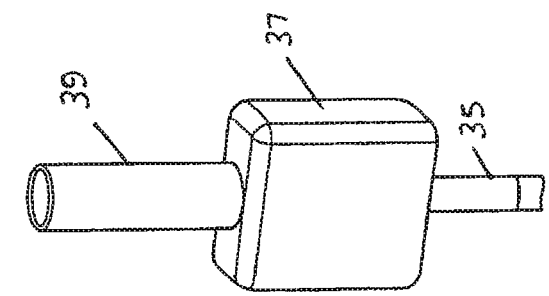
FIG. 3A is a preferred embodiment of a NaOCl inlet tube and a single suction tube connected to a manifold.
Figure 3B:
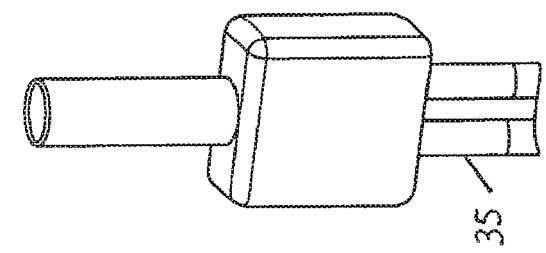
FIG. 3B is a preferred embodiment of the manifold with two suction tubes, each corresponding to a respective NIP needle.
Figure 3C:
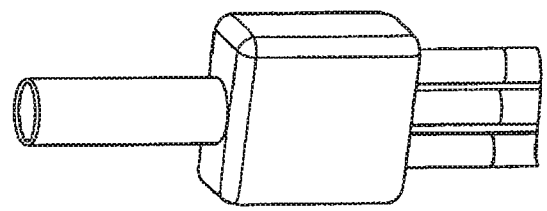
FIG. 3C is a preferred embodiment of the manifold with three suction tubes.
Figure 3D:
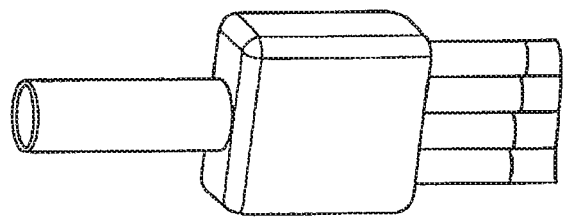
FIG. 3D is a preferred embodiment of the manifold with four suction tubes.

10 Negative pressure irrigation system
20 Needle or cannula
21 Suction inlet port
23 Tip or distal end
25 Slot
27 Remaining sidewall adjacent slot
29 End of 27
30 Tubing system
31 Irrigant supply tubing
33 Irrigant container
35 Needle tubing
37 Suction manifold
39 Evacuator tubing
41 Irrigant inlet tube or cannula
43 Tapered end
45 Lateral irrigant supply port
49 Dental vacuum system
51 Light-cure polymer

DETAILED DESCRIPTION OF THE PREFERRED EMBODIMENTS

Referring to FIGS. 2A-D, a preferred embodiment of a negative pressure irrigation ("NPI") system 10 includes a NPI needle or cannula 20 with two suction inlet ports 21 at its tip end 23. The ports 21 are preferably non-circular in shape. Unlike the prior art, the ports 21 are the only ports within the first 1 mm from the tip end 23 and, preferably, are sized in a range of greater than 0.1 mm and less than an internal diameter of the needle 20.

The inlet ports 21 of the needle 20 are preferably made by cutting a slot 25 in the tip end 23 of a needle material such as stainless steel or its equivalent; bending the remaining opposing sidewall portions 27 until their respective ends 29 touch; and joining, welding, or bonding together the now-touching ends 29 together. This arrangement provides the needle 20 with a maximum size of inlet ports 21 so the port 21, as well as the needle 20, is less likely to clog with pulp remnants and cut dentin debris. The closed tip end 23 prevents periapical tissue fluids from being suctioned up the needles instead of the intended irrigant (e.g. NaOCl) that is coursing down each of the canals alongside the needle or needles 20 that evacuate the canals.

Referring to FIGS. 3A-D, NPI system 10 includes a tubing system 30 reduced to just a single irrigant supply tubing or line 31 connected to an irrigant container 33, a NPI needle tubing 35 connected to the needle 20 and to one side of a suction manifold 37, and a single evacuator tubing 39 connected on the other side of the suction manifold 37 and to a dental evacuation system 49. The irrigant supply line 31 may include an irrigant inlet tube 41 with a tapered end 43 designed to tightly fit into a lateral irrigant supply port 45 previously drilled into a pulp chamber (see e.g. FIG. 4). The manifold 37 may have two or more NPI needle tubes 35 each arranged for connection to a corresponding NPI needle 20 for each canal in a given tooth.

The preferred embodiment of system 10 allows NPI needles 20 to be placed through the access cavity and to the end of each canal of a given tooth, along with an irrigant supply port 45 placed just into the pulp chamber of the tooth, after which a light-cure polymer 51 is syringed around these needles 20 and the irrigant supply port 45 to seal the access cavity so that all canals can be cleaned simultaneously, rendering the time needed for NPI in a four canal molar tooth, for example, to drop from 40 minutes to 10 minutes in total, without additional time required by the treating clinician.

Figure 4:
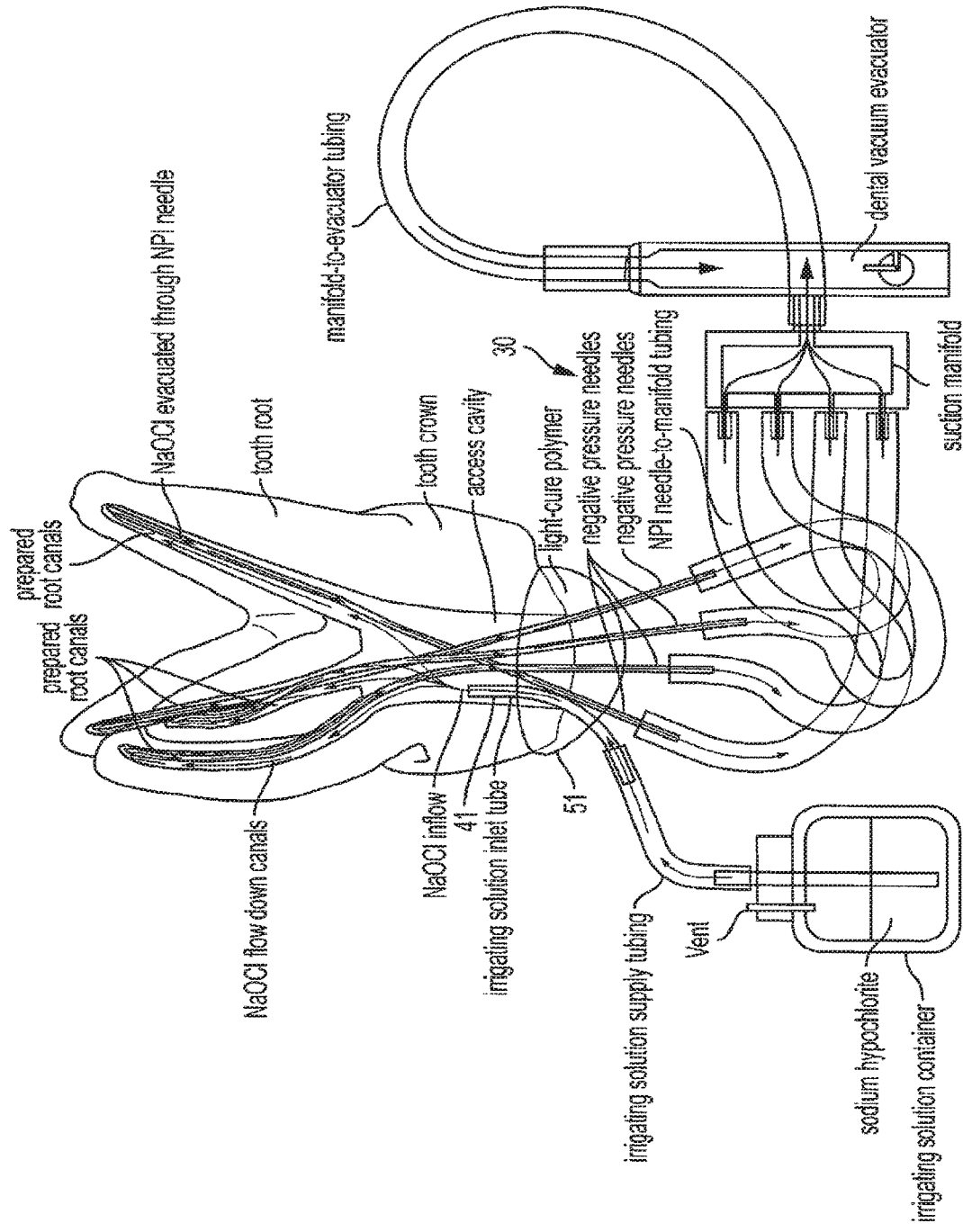
FIG. 4 is an example of a preferred embodiment of the system used in connection with a conventional access cavity cut into the pulp chamber.
Figure 5:
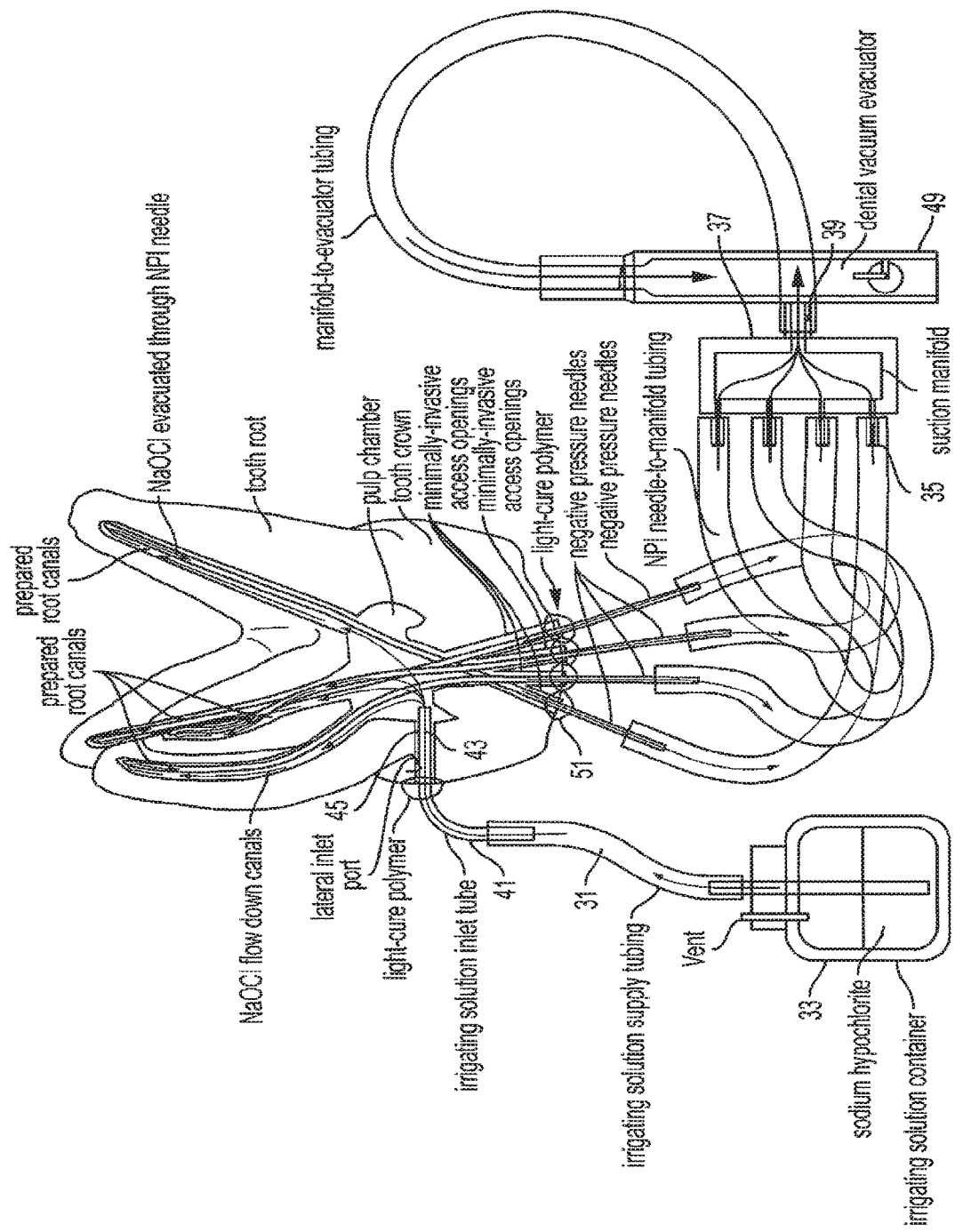
FIG. 5 is another example of the system applied through the crown of a molar tooth that has been entered with a multiplicity of minimally invasive access holes, plus a lateral inlet port hole to feed the NaOCl solution into the pulp chamber.

FIGS. 4 & 5 show two examples of system 10's application. The first example is in a tooth with a conventional access cavity cut into the pulp chamber. Each of the NPI needles 20 is inserted into the end points of the prepared canals, and an NaOCl inlet supply port 45 is placed, to feed solution into the pulp chamber. Each cannula is sealed with a light or chemically cured polymer 51 to create a closed system that automatically draws the NaOCl solution into the tooth through the vacuum delivered by the NPI needles 20 in each canal.

The second example shows system 10 applied through the crown of a molar tooth that has been entered with a multiplicity of minimally invasive access holes, cut by micro-burs or laser, plus a lateral inlet supply port 45 to feed the NaOCl solution into the pulp chamber alongside the NPI needles 20 in each canal. As in the first example, each of these cannulas is sealed with a light or chemically cured polymer 49 that is easily removed after irrigation has been completed.

What is claimed:

1. A method for simultaneously cleaning a plurality of root canals of a human tooth, the method comprising:
    for each root canal of the plurality, connecting a negative pressure irrigation needle (20) to a corresponding one of a tube (35) of a suction manifold (37);
    inserting each negative pressure irrigation needle into a corresponding root canal of the plurality, the negative pressure irrigation needles being spaced from the suction manifold;
    sealably surrounding a portion of each negative pressure irrigation needle adjacent the human tooth with a first light-cure polymer in an unpolymerized state;
    connecting an irrigant inlet tube (41) to an irrigant container (33);
    inserting the irrigant inlet tube into the human tooth, the irrigant inlet tube spaced from the negative pressure irrigation needles;
    sealably surrounding a portion of the irrigant inlet tube adjacent the human tooth with a second light-cure polymer sealably in an unpolymerized state; and
    maintaining a closed vacuum system when:
        drawing irrigant through the irrigant inlet tube into the plurality of root canals containing the negative pressure irrigation needles;
        suctioning the irrigant down each root canal of the plurality; and evacuating the irrigant from each root canal through a corresponding one of the negative pressure irrigation needles.

2. An endodontic irrigation system (10) comprising:

a suction manifold (37) including a first and a second tube (35);

a first and a second negative pressure irrigation needle (20) spaced from the suction manifold and connectable to a corresponding one of the first and second tubes;

an irrigant inlet tube (41) spaced from the first and second negative pressure irrigation needles;

a first and a second light-cure polymer (51) in an unpolymerized state; the first light-cure polymer sealably surrounding a portion of the irrigant inlet tube, the second light-cure polymer sealably surrounding a portion of the first and second negative pressure irrigation needles;

wherein when in use in a root canal system of a human tooth, the endodontic irrigation system maintains a closed system vacuum that:

draws irrigant through the irrigant inlet tube into a first root canal containing the first negative pressure irrigation needle and a second root canal containing the second negative pressure irrigation needle;

suctions the irrigant down the first and second root canals; and evacuates the irrigant from the first and second root canals through a corresponding one of the first and second negative pressure irrigation needles.

3. An endodontic irrigation system according to claim 2 further comprising the irrigant inlet tube including a tapered end (43).

4. An endodontic negative pressure irrigation according to claim 2 further comprising the first and second negative pressure irrigation needles each having a closed distal end and two suction inlet ports proximal to the closed distal end.

5. A negative pressure irrigation system according to claim 4 further comprising the two suction inlet ports being formed by:

cutting a slot (25) into a square-cut tip end of a needle material;

bending a remaining sidewall portion (27) of the needle material located on opposing sides of the slot toward one another so a respective tip end (29) of each remaining sidewall portion contacts an opposing respective tip end; and joining together the two tip ends when in contact with one another to create the closed distal end.

6. An endodontic irrigation system according to claim 2 further comprising a dental vacuum evacuator (49) connectable to the suction manifold and an irrigant container (33) connectable to the irrigation inlet tube.

7. An endodontic negative pressure irrigation according to claim 4 further comprising each suction inlet port being triangular in shape.

* * * * *